United States Patent

Inaba et al.

[15] 3,657,627

[45] Apr. 18, 1972

[54] TOOL SELECTION SYSTEM

[72] Inventors: Seiuemon Inaba; Kengo Kobayashi, both of Kawasaki, Japan

[73] Assignee: Fujitsu Limited, Kawasaki, Japan

[22] Filed: July 15, 1970

[21] Appl. No.: 55,148

[30] Foreign Application Priority Data

July 23, 1969 Japan..................................44/58147

[52] U.S. Cl..............................................318/601, 318/603
[51] Int. Cl.......................................................G05b 19/26
[58] Field of Search.................................318/601, 602, 603

[56] References Cited

UNITED STATES PATENTS 3,495,775  2/1970  Camillo..............................318/601 X
3,414,785  12/1968  Orahood et al........................318/603
3,517,286  6/1970  Stobbe.............................318/603 X

*Primary Examiner*—Benjamin Dobeck
*Attorney*—Curt M. Avery, Arthur E. Wilfond, Herbert L. Lerner and Daniel J. Tick

[57] ABSTRACT

Recorded instructions in a memory include a plurality of tool codes corresponding to tools to be selected and a plurality of corresponding tool addresses. A plurality of tools are stored in a movable tool storage. When a tool code is commanded in a tape, the storage address corresponding to such tool code is read out from the memory and moves the tool storage to a position at which the desired tool may be removed therefrom. The tool storage is halted when the tool address of the desired tool corresponds to the tool address read out from the memory.

4 Claims, 7 Drawing Figures

TOOL SELECTION SYSTEM

DESCRIPTION OF THE INVENTION

The invention relates to a tool selection system. More particularly, the invention relates to a tool selection system for automatically selecting a desired one of a plurality of tools.

In a known automatic tool selection system, each tool is provided with a corresponding code plate. A tool code is commanded to a numerical controller which selects a tool corresponding to the code. In another known automatic tool selection system, an address in a tool storage is commanded and the tool storage is rotated until the address has been located by search. The desired tool may thus be selected.

In the first-described known tool selection system, the machine system is complicated and complex since each tool must be provided with a code plate or the like. The second-described tool selection system is inconvenient from the viewpoint of the program, since a tool address is commanded.

The principal object of the invention is to provide a new and improved tool selection system.

An object of the invention is to provide a tool selection system which avoids the disadvantages of known types of tool selection systems.

An object of the invention is to provide a tool selection system which is of simple structure.

An object of the invention is to provide a tool selection system which eliminates the need for a code plate for each tool and in which a tool code is commanded for the selection of a tool from the tool storage.

An object of the invention is to provide a tool selection system wherein the program is considerably simplified.

An object of the invention is to provide a tool selection system wherein the program simply designates a tool code for the tool to be selected.

An object of the invention is to provide a tool selection system which functions with efficiency, effectiveness and reliability.

In accordance with the invention, a tool selection system comprises a movable tool storage storing a plurality of tools and having a plurality of tool addresses each for a corresponding one of the tools. Memory means stores a plurality of tool codes and a plurality of corresponding tool addresses. Command means coupled to the memory means commands a tool code for a tool to be selected and locates the tool address in the memory means for the tool code. Tool removing means removes a tool from the tool storage. Tool storage position indicating means indicates the position of the tool storage thereby indicating the tool address of the tool in proximity with the tool removing means. Control means coupled between the tool storage position indicating means and the memory means and the tool storage controls the movement of the tool storage to move the tool to be selected into proximity with the tool removing means when the selected tool address of the memory means coincides with the tool address of the tool storage position indicating means.

The control means comprises a motor coupled to the tool storage for moving the tool storage. Motor driving means drives the motor. Comparing means has an input coupled to the memory means, an input coupled to the tool storage position indicating means and an output coupled to the motor driving means.

The memory means is coupled to the motor driving means and controls the rotation and direction of rotation of the motor, in one embodiment of the invention. The control means halts the rotation of the motor upon coincidence of the selected tool address of the memory means and the tool address of the tool storage position indicating means.

In another embodiment of the invention, the motor driving means rotates the motor continuously and the control means halts the rotation of the motor upon coincidence of the selected tool address of the memory means and the tool address of the tool storage position indicating means.

In order that the invention may be readily carried into effect, it will now be described with reference to the accompanying drawings, wherein:

FIG. 2 is a schematic block diagram illustrating a method of memorizing tool codes;

Figure 1:
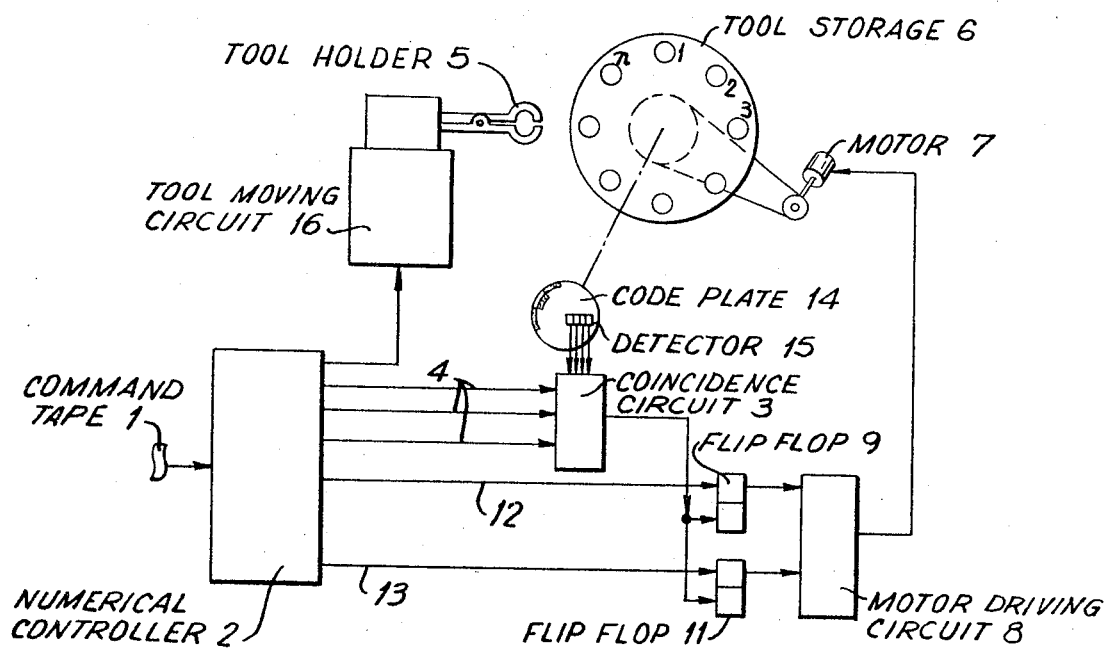
FIG. 1 is a schematic block diagram of an embodiment of the tool selection system of the invention.

In FIG. 1, a command tape 1 has numerical control information or data and tool codes representing different tools to be used recorded therein. The command tape 1 may comprise, for example, a perforated tape, wherein the numerical control data and tool codes are punched. A numerical controller 2 reads out the data recorded in the command tape 1. The numerical controller 2 reads out the tool code commanded by the command tape 1 and selects or detects an address recorded in said numerical con-troller corresponding to the read out tool code. The numerical controller 2 then transmits the tool address corresponding to the read out tool code to a coincidence circuit 3 via leads 4.

The numerical controller 2 includes a memory wherein the tool codes, representing tools to be selected, and as indicated in the command tape 1, and the corresponding tool addresses are recorded. The tool addresses are those which correspond to the tools stored in a tool storage, from which the selected tool is to be removed.

A tool holder 5 functions to remove a tool from a tool storage 6 when the tool storage is rotated to a position wherein the tool to be removed is in operative proximity with said tool holder. The tool holder 5 may also be utilized to reinsert a tool in the tool storage 6. The tool storage 6 is movable or rotatable under the control of a motor 7 which is coupled to and drives said tool storage. The motor 7 is driven by a motor driving circuit 8 which drives the motor 7 in either a forward direction or a reverse direction.

The coincidence circuit 3 has an output connected to the reset input of each of a pair of flip flops 9 and 11. The numerical controller 2 has inputs connected to the set inputs of the flip flops 9 and 11 via leads 12 and 13, respectively. The set output of each of the flip flops 9 and 11 is connected to an input of the motor driving circuit 8. When there is a signal in the set output of the flip flop 9, the motor driving circuit 8 drives the motor 7 in a forward direction, thereby rotating the tool storage 6 in a forward direction. When there is a signal in the set output of the flip flop 11, the motor driving circuit 8 drives the motor 7 in a reverse direction, thereby rotating the tool storage 6 in a reverse direction.

The actual address of the tool in proximity with the tool holder 5 is supplied to inputs of the coincidence circuit 3. There are n tool storage positions in the tool storage 6. Each of the n tool storage positions has a numerical value designated by a tool storage address or tool address provided at the circumference of the tool storage 6. A code plate 14 is mounted on the shaft of rotation of the tool storage 6 so that said code plate rotates with said tool storage. The code plate 14 has a code corresponding to the tool storage addresses recorded thereon. A detector 15 reads out the code recorded on the code plate 14 and transmits to the coincidence circuit 3 the code corresponding to the tool storage address of each tool in the tool storage 6 as it passes in proximity with the tool holder 5.

When a command in the command tape 1 commands the selection of a tool, the numerical controller 2 reads out the tool code of the tool to be selected. The numerical controller 2 then selects the tool address corresponding to the tool code of the tool to be selected and transmits said tool address to the coincidence circuit 3. The coincidence circuit 3 then compares the tool address of the tool to be selected with the tool address of each tool stored at the tool storage 6 as said tool storage rotates past the tool holder 5. As each tool moves into proximity with the tool holder 5, its tool address is transmitted to the coincidence circuit 3. The coincidence circuit 3 directs the motor driving circuit 8 to rotate the tool storage 6, via the motor 7, in either forward direction or reverse direction, as long as there is no coincidence between the tool address of the tool to be selected and the tool address of the tool in operative proximity with the tool holder 5.

When the coincidence circuit 3 determines coincidence between the tool address of the tool to be selected, as received from the numerical controller 2, and the tool address of the tool in proximity with the tool holder 5, said coincidence circuit halts the operation of the motor 7, thereby halting the movement or rotation of the tool storage 6. The tool holder 5 may then remove the desired tool from the tool storage 6. The coincidence circuit 3 halts the operation of the motor 7 by resetting either of the flip flops 9 or 11, depending upon which of said flip flops has been producing an output signal in its set output. As soon as the active flip flop of the flip flops 9 and 11 is reset, it produces no output signal at its set output, so that motor 7 is deenergized via the motor driving circuit 8.

When the tool storage 6 is halted, and the desired tool is in proximity with the tool holder 5, said desired tool is removed from the tool storage 6 by the tool holder 5, under the control of a tool moving circuit 16, which comprises a known circuit, and which functions in a known manner, to control the removal of a tool from the tool storage and to control the insertion of a tool into the tool storage.

Figure 2:
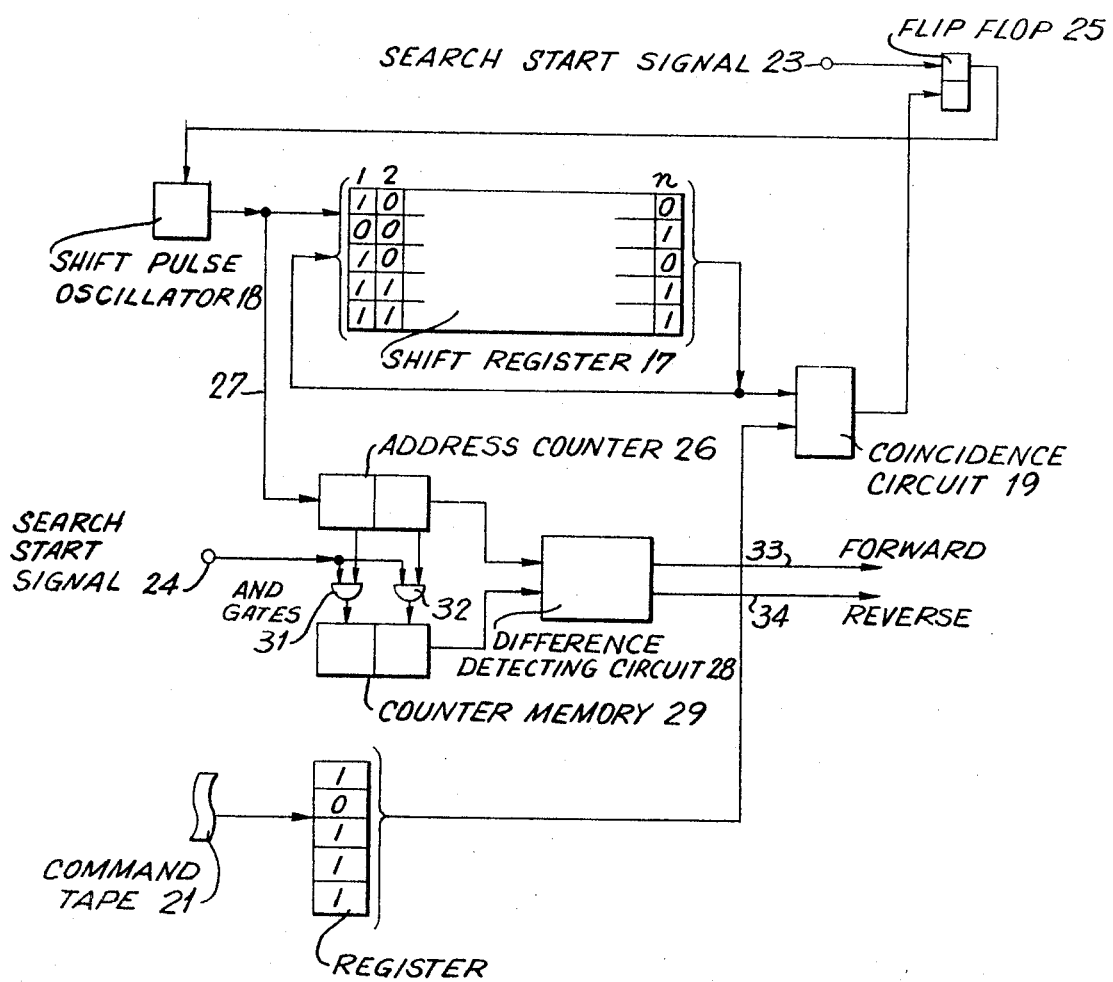
FIG. 2 is a schematic block diagram of the principal part of the system of FIG. 1.

FIG. 2 is an embodiment of a circuit for detecting the tool storage address corresponding to the tool code recorded in the command tape 1. The correspondence between tool code and tool addresses is recorded or memorized, prior to the operation of the tool selection system, in a shift register 17. The shift register 17 comprises a plurality of register parts of a number equal to the number of tool addresses. That is, there are n register parts in the shift register 17. The register parts of the shift register 17 are interconnected. Each of the register parts comprises, for example, a 5 bit tool code.

The tool code such as, for example, 10111, recorded in the first address 1 is shifted to the second address 2 each time a pulse is supplied to the shift register 17 from a shift pulse oscillator 18 having an output connected to an input of said shift register. The tool code of the $n^{th}$ address n such as, for example, 01011, is shifted to the first address 1 of the shift register 17 and is supplied to a coincidence circuit 19.

If a tool code is commanded by a command tape 21, the commanded tool code is set in a register 22, having an input connected to a tape readout (not shown in FIG. 2). The register 22 transmits a numerical value to an input of the coincidence circuit 19. Consequently, a search start signal SS is provided at each of a pair of input terminals 23 and 24. The search start signal SS supplied to the input terminal 23 sets a flip flop 25. The set input of the flip flop 25 is connected to the input terminal 23 and the set output of said flip flop is connected to the input of the shift pulse oscillator 18. When the flip flop 25 is set, its output signal operates the shift pulse oscillator 18, and said oscillator supplies a shift pulse to the shift register 17.

If the numerical indication or code supplied to the coincidence circuit 19 from the shift register 17 coincides with the numerical value or code supplied to said coincidence circuit from the register 22, said coincidence circuit produces an output signal, which is supplied to the reset input of the flip flop 25. The signal supplied to the reset input of the flip flop 25 resets said flip flop and deenergizes the shift pulse oscillator 18, so that shifting of the shift register 17 is halted. The shifts of the shift register 17 are counted in an address counter 26.

The address counter 26 has a counting capacity of n. Thus, by adjusting the initial condition of the shift register 17 and the initial condition of the address counter 26, a numerical value of a tool address corresponding to the commanded tool code may be expressed in said address counter.

The shift of the shift register 17 is supplied to the address counter 26 via a lead 27 connected to the output of the shift pulse oscillator 18.

The content of the address counter 26 is transmitted to an input of a difference detecting circuit 28 and to an input of a counter memory 29. The content of the address counter 26 is transmitted to the counter memory 29 via AND gates 31 and 32, under the control of the search start signal supplied via the input terminal 24. The content of the address counter 26 is transmitted to the counter memory 29 prior to the supply of the search start signal SS. When the search start signal SS is provided, the actual tool address of the tool storage is stored in the counter memory 29 and the tool address corresponding to the commanded tool code is stored in the address counter 26.

The output of the counter memory 29 is connected to another input of the difference detecting circuit 28. In order to increase the speed of selection of the desired tool, the difference detecting circuit 28 detects the difference between the commanded tool address and the actual tool address and transmits a command in a lead 33 or 34. A command in the lead 33 actuates the motor driving circuit to rotate the motor in a forward direction and a command in the lead 34 actuates said motor driving circuit to rotate the motor in a reverse direction. The content of the address counter 26 is transmitted to the coincidence circuit 3 of the embodiment of FIG. 1.

Figure 4:
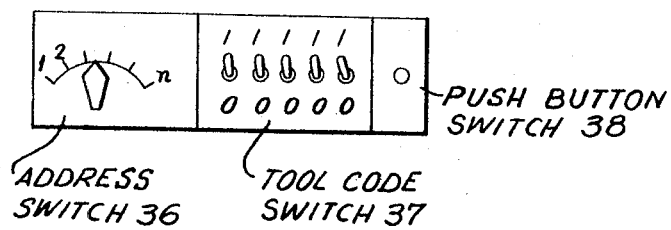
FIG. 4 is a schematic diagram showing a switchboard for supplying the addresses of the tool storage and tool codes.
Figure 3:
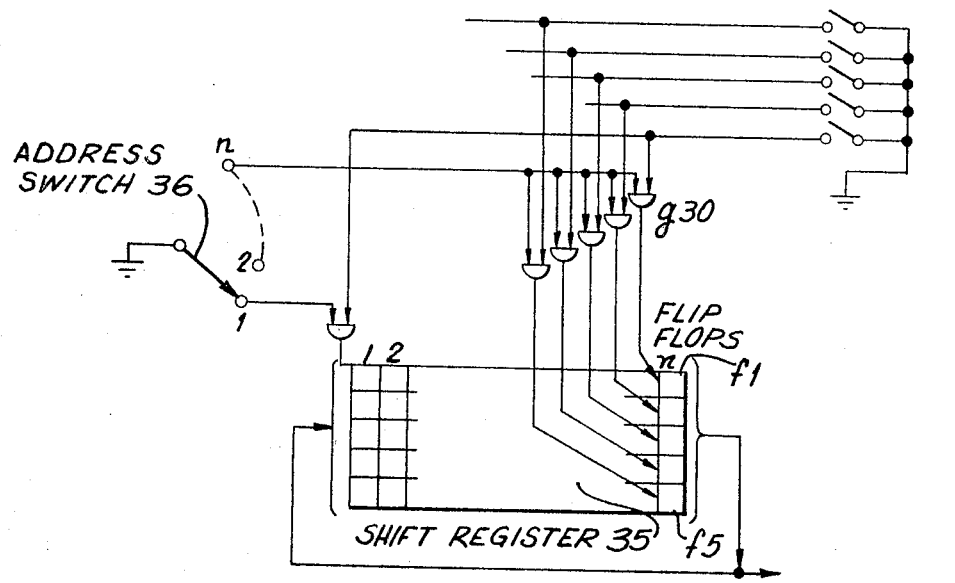

FIG. 3 illustrates a method of recording the relation between tool codes and tool addresses, wherein the tool codes are stored in a memory circuit comprising a shift register 35. FIG. 4 is an illustration of a switchboard for providing an input. In the switchboard, an address switch 36 commands tool addresses and a tool code switch 37 sets tool codes. The switchboard includes a push button switch 38. When the push button switch 38 is depressed, after the address switch 36 and the tool code switch 37 are set, a tool code designated by said tool code switch is recorded or memorized in the address position designated by said address switch in the shift register 35 of FIG. 3.

In FIG. 3, each bit or component of the shift register 35 comprises a well known two input flip flop. If the address switch 36 is connected to an input terminal n, and the tool code switch 37 is closed in accordance with the tool code, tool codes are transmitted to a plurality of flip flops $f1$ to $f5$ corresponding to the tool address n. When the push button switch 38 of the switchboard shown in FIG. 4 is depressed, the flip flops $f1$ to $f5$ are triggered and set the code input. The tool codes for the other tool addresses 1, 2, 3, . . . n-1 are recorded in the same manner as described for the address n.

Figure 5:
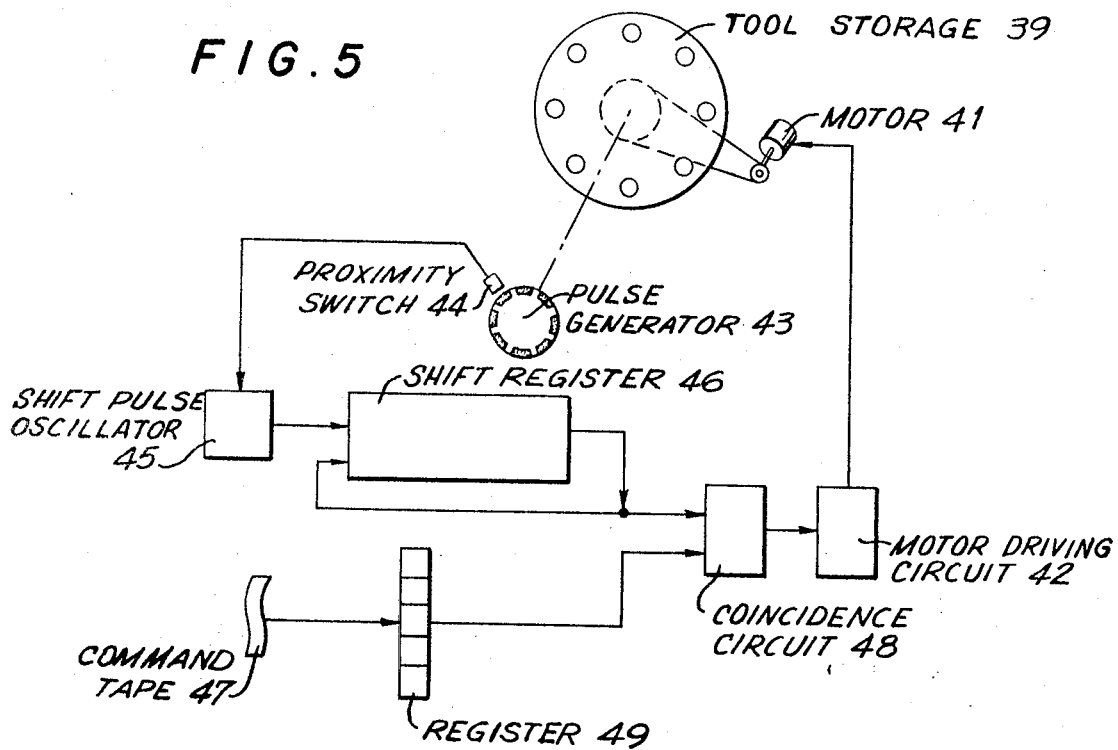
FIG. 5 is a schematic block diagram of another embodiment of the tool selection system of the invention.

In the embodiment of FIG. 5, the shift register and the tool storage are shifted in synchronism with each other until the tool code corresponding to the commanded tool code is detected. When the tool code of the tool storage coincides with the commanded tool code, the movement or rotation of the tool storage is halted. In the embodiment of FIG. 5, a tool storage 39 is continuously rotated by a motor 41 coupled thereto. The motor 41 is driven by a motor driving circuit 42. A pulse generator 43 is affixed to the shaft of the tool storage 39 and rotates in synchronism therewith.

The pulse generator 43 transmits a pulse each time a tool stored in the tool storage 39 passes in proximity with a tool holder of the type described with reference to FIG. 1, and not shown in FIG. 5. The pulse generator 43 may comprise, for example, a rotatably mounted plate of non-magnetic material having areas of magnetic material equidistantly spaced from each other around said plate. A proximity switch 44 is positioned in operative proximity with the rotating plate of the pulse generator 43 and produces a signal or pulse each time a magnetized area passes in close proximity therewith. The output signals of the proximity switch 44 are transmitted to a shift pulse oscillator 45.

Each time a pulse or signal is supplied to the shift pulse oscillator 45 from the proximity switch 44, a shift register 46 is shifted by one step. The output of the shift pulse oscillator 45 is connected to an input of the shift register 46. When the tool command from a command tape 47 coincides with the tool code shifted out from the shift register 46, a coincidence circuit 48 halts the operation of the motor 41 via the motor driving circuit 42. The output of the coincidence circuit 48 is connected to the input of the motor driving circuit 42. The output of the shift register 46 is connected to an input of the coincidence circuit 48. The read out tool code from the tape 47, read out by a suitable device, not shown in FIG. 5, is supplied to a register 49, having an input connected to the readout device and an output connected to the other input of the coincidence circuit 48.

Figure 6:
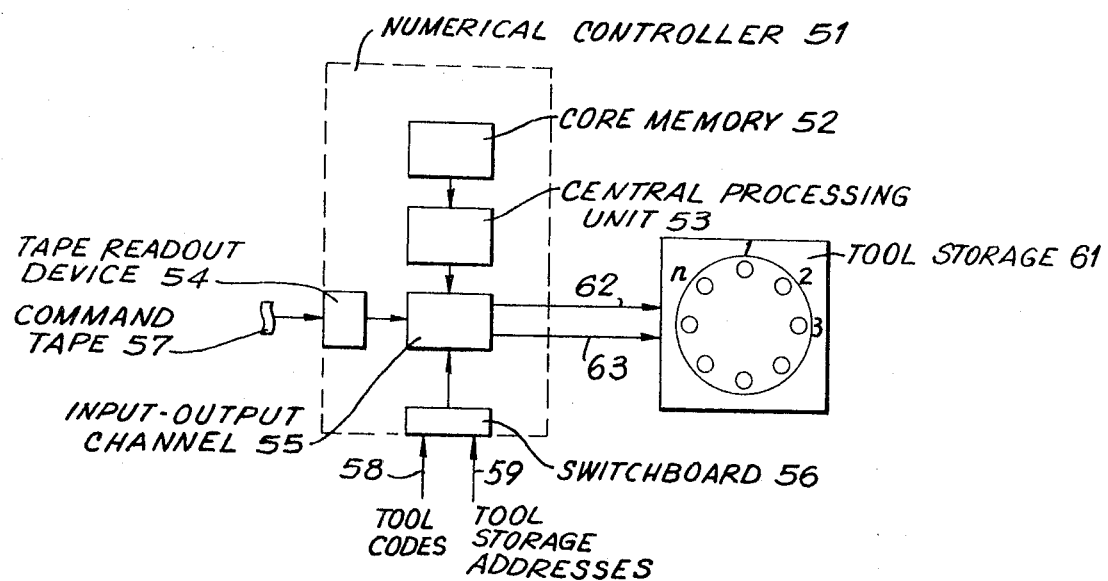
FIG. 6 is a schematic block diagram of a numerical controller of stored program type which may be utilized in the tool selection system of the invention.

FIG. 6 illustrates a numerical controller of the stored program type which may be utilized in the tool selection system of the invention. In FIG. 6, a numerical controller 51 comprises a numerical controller of stored program type. The numerical controller 51 comprises a core memory 52, a central processing unit 53, a tape readout device 54, an input-output channel 55 and a switchboard 56. The output of the core memory 52 is connected to the input of the central processing unit 53. The output of the central processing unit is connected to an input of the input-output channel 55. The output of the tape readout device 54 is connected to an input of the input-output channel 55. The output of the switchboard 56 is connected to an input of the input-output channel 55.

The input of the tape readout device 54 is in operative proximity with a command tape 57. An input 58 to the switchboard 56 supplies tool codes thereto, An input 59 to the switchboard 56 supplies tool storage addresses thereto. The input-output channel 55 transfers informations or data between the central processing unit 53 and the tape readout device 54, and the switchboard 56. The data transferred via the input-output channel 55 is transmitted to a tool storage 61 via a pair of leads 62 and 63.

Figure 7:
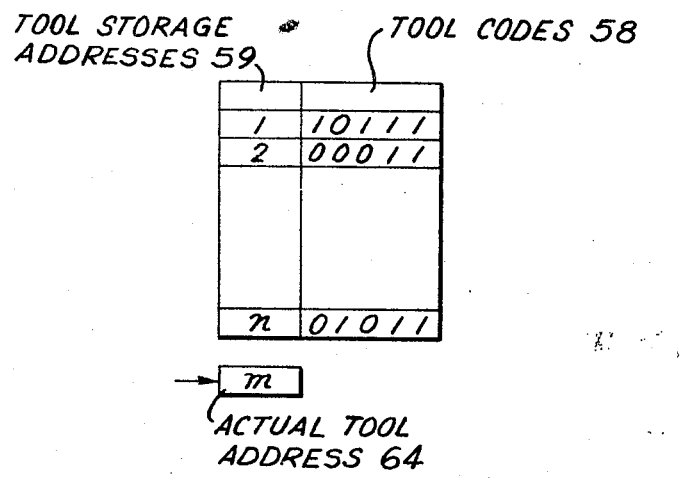
FIG. 7 illustrates the correspondence between the tool storage addresses and the tool codes.

The core memory 52 of the numerical controller 51 records or memorizes a table as shown in FIG. 7. The table of FIG. 7 indicates the relation between the tool storage addresses 59 of the tool storage and the tool codes 58 corresponding to such addresses. If the code of a tool to be selected is commanded by the command tape 57, via the tape readout device 54, the tool address corresponding to the commanded tool code is determined by a search or scanning procedure and the numerical value of the tool address is transmitted to the tool storage 61.

The actual tool address 64, which indicates the instantaneous position of the tool storage 61, by indicating the tool address of the tool then in proximity with the tool holder (not shown in FIG. 6), is also recorded in the core memory 52. The actual tool address is compared with the tool address in which the tool to be selected was previously located to determine whether the tool storage 61 should be rotated in a forward direction or a reverse direction. An output signal indicating the direction of rotation of the tool storage 61 is transmitted to said tool storage via the lead 63.

The tool storage 61 is rotated by the signal transmitted thereto via the lead 63 from the input-output channel 55 of the numerical controller 51. The The output signal from the accessory code disc (not shown in FIG. 6), coupled to and rotatable with the tool storage 61, is compared with the selected tool address. If the signal from the accessory code disc coincides with the tool address, the rotation of the tool storage 61 is halted and the desired tool is removed by the tool holder. The tool code data 58 and the tool storage address data 59 are recorded in the core memory 52 prior to operation of the switchboard 56.

It is possible to modify the tool selection system of FIG. 6 in a manner whereby the tool storage does not include a tool storage address and the tool codes recorded in the core memory 52 of the numerical controller 51 are checked in synchronism with the rotation of said tool storage. The tool storage is then halted and the desired tool is removed, when a tool code coinciding with the code recorded on the command tape is detected. In such a modification, it is necessary to replace the core memory 52 by suitable flip flop or the like.

While the invention has been described by means of specific examples and in specific embodiments, we do not wish to be limited thereto, for obvious modifications will occur to those skilled in the art without departing from the spirit and scope of the invention.

We claim:

1. A tool selection system, comprising
   a movable tool storage storing a plurality of tools and having a plurality of tool addresses each for a corresponding one of said tools, each of said tools having a corresponding tool code and being free from tool code elements;
   memory means storing each of the tool codes and each of a plurality of tool addresses corresponding to each of the codes;
   command means coupled to said memory means for commanding a tool code for a tool to be selected and locating the tool address in said memory means for said tool code;
   tool removing means for removing a tool from said tool storage;
   tool storage position indicating means for indicating the position of said tool storage thereby indicating the tool address of the tool in proximity with said tool removing means; and
   control means coupled between said tool storage position indicating means and said memory means and said tool storage for controlling the movement of said tool storage to move the tool to be selected into proximity with said tool removing means when the selected tool address of said memory means coincides with the tool address of said tool storage position indicating means.

2. A tool selection system as claimed in claim 1, wherein said control means comprises a motor coupled to said tool storage for moving said tool storage, motor driving means for driving said motor and comparing means having an input coupled to said memory means, an input coupled to said tool storage position indicating means and an output coupled to said motor driving means.

3. A tool selection system as claimed in claim 2, wherein said memory means is coupled to said motor driving means and controls the rotation and direction of rotation of said motor and said control means halts the rotation of said motor upon coincidence of the selected tool address of said memory means and the tool address of said tool storage position indicating means.

4. A tool selection system as claimed in claim 2, wherein said motor driving means rotates said motor continuously and said control means halts the rotation of said motor upon coincidence of the selected tool address of said memory means and the tool address of said tool storage position indicating means.

* * * * *